United States Patent [19]
Lewis et al.

[11] Patent Number: 5,359,362
[45] Date of Patent: Oct. 25, 1994

[54] VIDEOCONFERENCE SYSTEM USING A VIRTUAL CAMERA IMAGE

[75] Inventors: John P. Lewis; Maximillian A. Ott, both of Princeton; Ingemar J. Cox, Lawrenceville, all of N.J.

[73] Assignees: NEC USA, Inc.; NEC Research Institute, Inc., Princeton, N.J.

[21] Appl. No.: 40,161

[22] Filed: Mar. 30, 1993

[51] Int. Cl.⁵ .............................................. H04N 7/12
[52] U.S. Cl. .......................................... 348/15; 348/20
[58] Field of Search ...................... 379/53, 54; 358/85, 358/87, 213.11, 213.13, 60, 64, 231; 348/14–16, 20, 373, 374, 207, 222

[56] References Cited

U.S. PATENT DOCUMENTS

| | | | |
|---|---|---|---|
| 3,291,905 | 12/1966 | Smith | 358/87 |
| 4,890,314 | 12/1989 | Judd et al. | 379/53 |
| 5,159,445 | 10/1992 | Gitlin et al. | 379/53 |

OTHER PUBLICATIONS

S. Skerjanc and J. Liu, "A three camera approach for calculating disparity and synthesizing intermediate pictures", Signal Processing Image Communications 4 (1991) pp. 55–64.

*Primary Examiner*—Wing F. Chan
*Attorney, Agent, or Firm*—Arthur J. Torsiglieri; Philip J. Feig

[57] ABSTRACT

A teleconferencing video system uses two cameras at each station symmetrically positioned on opposite sides of the optical axis between the speaker and the monitor used to produce an image of the listener. The two cameras are used to provide from the two images observed by the cameras a virtual image corresponding to the image that would be viewed by a camera located on the first-mentioned optical axis. This system permits eye contact to be maintained between a speaker and a listener at different stations whereby the feeling of intimacy is enhanced.

5 Claims, 1 Drawing Sheet

VIDEOCONFERENCE SYSTEM USING A VIRTUAL CAMERA IMAGE

FIELD OF INVENTION

This invention relates to an apparatus and method for creating a virtual view of a scene from views of the same scene from two or more cameras placed along different lines of sight for use in a video teleconferencing system. A virtual view is a view of the scene from a position different from that of any of the cameras.

BACKGROUND OF THE INVENTION

There are numerous instances where there is desired a view of a scene that corresponds to a view which is difficult or impossible to achieve directly. One important instance of this is in video conferencing.

In video conferencing, it is advantageous for creating a feeling of intimacy between participants at different stations for them to establish and maintain eye contact with one another during a conversation.

In practice, this is difficult. Generally, to preserve eye contact between two participants in a teleconference both the camera recording the speaker and the local monitor reproducing for viewing an image of the remote listener need to be positioned on the same optical axis, so as to have the speaker look simultaneously into the camera and at the listener in the monitor. However, the camera and the monitor cannot both physically be on a common straight optical axis without one blocking the other.

In the past, expedients such as the use of a half-mirror oriented at 45 degrees in the gaze direction and the positioning of the camera and the mirror orthogonally with respect to the mirror have been used to achieve this end. However, this expedient is awkward and sacrifices both light from the monitor and light to the camera.

The invention aims at a different solution.

SUMMARY OF THE INVENTION

The present invention is based on using at each station of a video conferencing system at least a pair of cameras, neither of which is on the same optical axis as the local monitor, to obtain a three-dimensional description of the speaker and from this description obtaining for reproduction by the remote monitor at, the listener's station a virtual image corresponding to the view along the optical axis of the camera at the speaker's station. The partial 3D description at the scene can be used to construct an image of the scene from various desired viewpoints. The three dimensional description is most simply obtained by viewing the scene of interest, by a pair of cameras, typically preferably aligned symmetrically on either left and right or above and below, about the optical axis of the monitor, solving the stereo correspondence problem, and then producing the desired two dimensional description of the virtual image for use by the monitor at the listener's station. However, in some cases, it may prove advantageous to employ more than two cameras appropriately disposed to get more than two views to achieve the desired virtual image by synthesis of the plural views.

Advantageously, the process of creating the desired two-dimensional description for use as the virtual image consists of four steps, calibration, stereo matching, reconstruction and interpolation. The calibration converts the view from two tilted cameras into two parallel views important for stereo matching. The stereo matching step matches features, such as pixels, between the two views to obtain a displacement map that provides information on the changes needed to be made in one of the observed views. The reconstruction step constructs the desired virtual view along the axis between the two cameras from the displacement map and an observed view, thereby recovering eye contact. The final step is to fill in by interpolation areas where complete reconstruction is difficult because of gaps in the desired virtual view that result from limitations in the displacement map that was formed.

The invention will be more fully discussed in connection with the accompanying drawing.

DETAILED DESCRIPTION OF THE INVENTION

Figure 1:
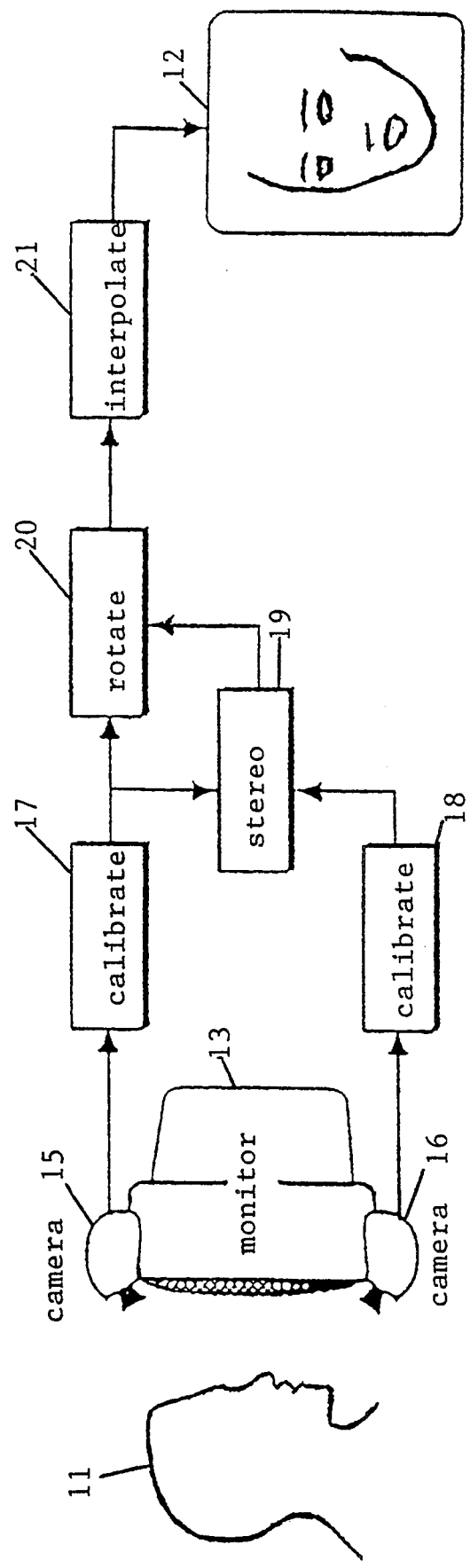
FIG. 1 shows in block schematic form the apparatus that would be located at each station in a video teleconferencing system that is in accordance with one embodiment of the invention.

With reference now to the drawing, FIG. 1 shows the outline of a speaker 11 at one station whose image is to be reproduced in a monitor 12 that is located at a remote station of a listener participating in a teleconference.

To maintain eye contact the speaker 11 would be looking directly into the screen of the monitor 13 located at his site. An image of the speaker is captured by each of the two separate cameras 15 and 16 mounted above and below the monitor 13, respectively, as seen in the figure. As shown, advantageously camera 15 is tilted downwards and camera 16 tilted upwards to get a fuller and so better view of the speaker. Both because of this and their vertical displacement, the two cameras see slightly different views of the speaker, with neither of these views exhibiting the desired eye contact. Alternatively, the two cameras could be located symmetrically about the optical axis on the left and right sides of it.

Available stereo algorithms generally match features along epipolar lines. Epipolar lines coincide with image scanlines of the cameras if camera axes are parallel. Once the axes are parallel, finding the matching points becomes a standard one-dimensional stereo correspondence problem.

Because the cameras 15 and 16 have opposite tilts, it is necessary to transform the scanlines of the two cameras to epipolar lines to reduce finding matching points to a simple one- dimensional problem. The calibration of such images to align the epipolar lines with the scan lines is a well known technique and is described, for example, in a paper entitled "Camera Self-Calibration: Theory and Experiments" published in the Proceedings for the European Conference on Computer Vision, pps 321–334 (1992) by O. D. Faugeras, Q-T Luong and S. J. Maybank.

In the calibration stage a correction matrix is applied to each video image. This correction matrix can be applied as a uniform calibration to all subsequent video images so long as the camera position remains unchanged.

One method to obtain the calibration matrix for a given camera arrangement is to record the image of a known test pattern in each camera. The position of each camera in a common coordinate system can be calculated from the individual projection of the above mentioned test pattern.

As described above, all cameras should be oriented parallel. The geometric operation necessary to rotate a given camera image into this desired direction is in fact the above mentioned calibration matrix.

After the necessary calibration of each of the images denoted schematically by blocks 17, 18, there is performed stereo matching between the images, in any known fashion denoted schematically by block 19. This involves determining the pixel correspondence in the images after which there can be produced disparity maps which indicates the relative offset between a pixel in one image and its corresponding pixel in the other image. The disparity maps contain the information needed to generate the virtual view that is to be reproduced at the monitor to be seen by the listener.

A particularly efficient algorithm that can be used for the stereo matching is described both in copending application Ser. No. 07/947,493 filed Sep. 18, 1992 and having a common assignee as the instant application, and in a paper entitled "Stereo without disparity gradient smoothing: a bayesian sensor fusion solution" presented at the British Machine Vision Conference (1992) by Cox, Hingorani, Maggs and Rao.

This stereo algorithm matches individual pixel intensities using a maximum likelihood cost function and cohesivity constraints and provides a dense disparity map. It also avoids feature extraction and adaptive windowing techniques common to other stereo algorithms and so is more efficient. Additionally, this stereo algorithm is fast, can be highly parallel, and uses dynamic programming efficiently, factors important to permit use in fast systems.

Because depth can be obtained from disparity, the disparity map provides a partial three-dimensional scene description that can be rotated, translated and projected to an arbitrary viewpoint. While the projection to an arbitrary viewpoint generally requires the use of known 3D hidden surface removal techniques, we have found that human heads have few occluding features when seen from most viewpoints. Accordingly, we have found that surprising good results can be achieved with a pair of cameras and that for a virtual view exactly midway between two parallel cameras as described, each pixel from one view need be simply shifted by one half the disparity at such pixel. This is denoted schematically by block 20. Of course, if the local monitor were located other than midway between the two cameras an appropriate adjustment needs to be made in the amount of disparity that needs be shifted.

It is usually impossible to make a disparity map of all the details of the speaker because of the nature of the human head. While the human head is fairly convex, so that most points are visible to both cameras, some occlusions will generally exist. Points present in one image but occluded in the other image have no associated disparity values and so give rise to voids in the disparity map.

Although voids in the disparity map can be filled in by interpolation from adjacent areas, we have found it preferable to ignore image areas whose disparity is unknown, thereby causing the construction problem to be manifested initialy as holes in the virtual image. These can later be handled by a suitable scattered data interpolation method, such as is described in the book entitled "From Images to Surfaces" by W. E. L. Grimson, published by MIT Press, (Cambridge, Mass. (1981). In particular, the thin-plate spline interpolation method there described can provide high quality interpolation although one may chose to employ even simpler alternatives with some decrease in quality. The interpolation is shown schematically by block 21.

Errors in the disparity map caused by incorrect pixel matching can cause artifacts in the constructed virtual image that in a motion sequence often appear as noise. When such artifacts are serious, temporal averaging in known fashion can be employed to reduce their prominence.

It is to be understood that the particular embodiment is merely illustrative of the general principles of the invention. Various modification should be feasible, including the use of alternative methods to create the virtual image needed, without departing from the spirit and scope of the invention.

What is claimed is:

1. A video conferencing system in which virtual eye contact can be established between participants in a teleconference characterized in that each station of the system comprises:

at least a pair of camera means, each camera means disposed for recording a different view of a first participant at the instant station, each view having common features, monitor means for reproducing a virtual image of a second participant at a distant station for viewing by the first participant at the instant station, means supplied with the different views of the first participant for generating a virtual image of the first participant viewing the virtual image of the second participant in said monitor means, and means for supplying the virtual image of the first participant to said monitor means for viewing by the second participant.

2. A video conference system in accordance with claim 1 in which said at least a pair of camera means at the instant station are disposed symmetrically with respect to the monitor means at the instant station.

3. A video conference system in accordance with claim 2 in which said means for generating a virtual image of the first participant includes means for converting the different view from the pair of camera means into two parallel views, means for stereo matching the two parallel views to obtain a displacement map, means for constructing the virtual image from the displacement map and the view from one of the camera means in a pair of camera means, and means for interpolating to remove gaps in the virtual image.

4. A video conferencing system in which virtual eye contact of a speaker can be established comprising:

at least a pair of camera means, each camera means disposed for recording a different view of a speaker, each view having common features;

means for generating a virtual image of the speaker from the recorded different views of the speaker; and monitor means for receiving the virtual image of the speaker for viewing by a listener.

5. A video conferencing system in accordance with claim 4 in which said means for generating a virtual image includes means for converting the different views into two parallel views, means for stereo matching the two parallel views to obtain a displacement map, means for constructing a virtual image from the displacement map and the view from one of the camera means in the pair of camera means, and means for interpolating to remove gaps in the virtual image.

* * * * *